Sept. 18, 1934.  W. P. SHOMAKER  1,974,369
PRINTING BELT
Filed Jan. 25, 1932  2 Sheets-Sheet 1
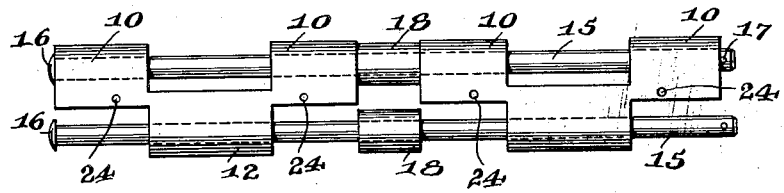
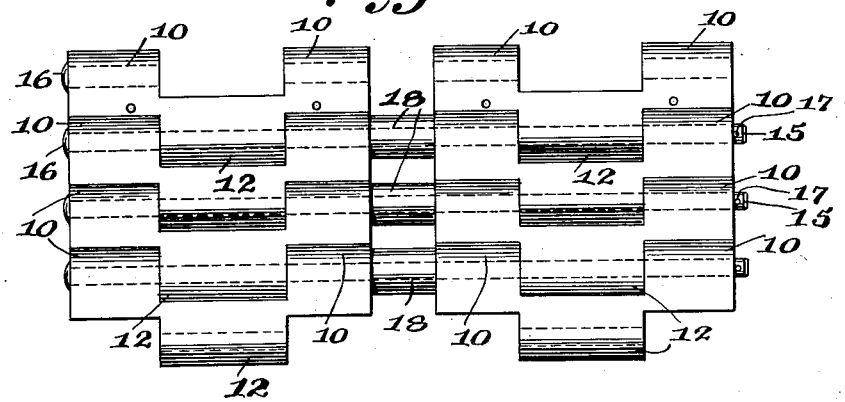
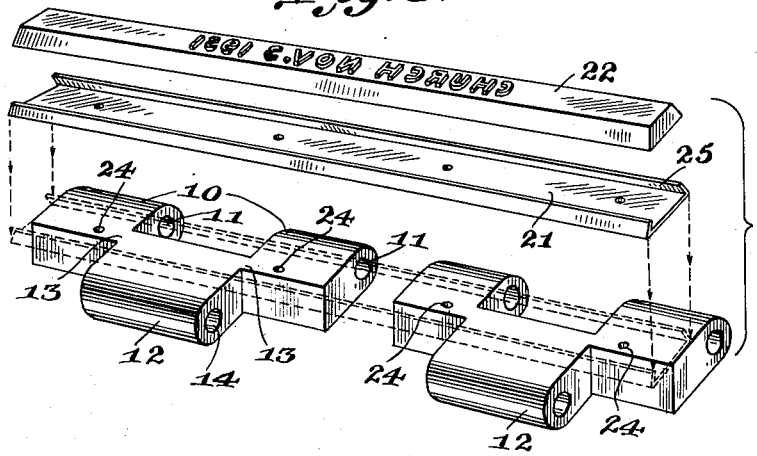
Inventor
Wesley P. Shomaker,
By Mawhinney & Mawhinney,
Attorneys Sept. 18, 1934.   W. P. SHOMAKER   1,974,369
PRINTING BELT
Filed Jan. 25, 1932   2 Sheets-Sheet 2
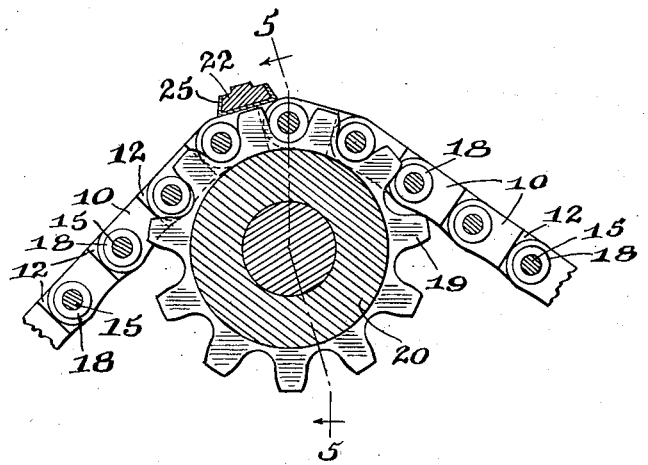
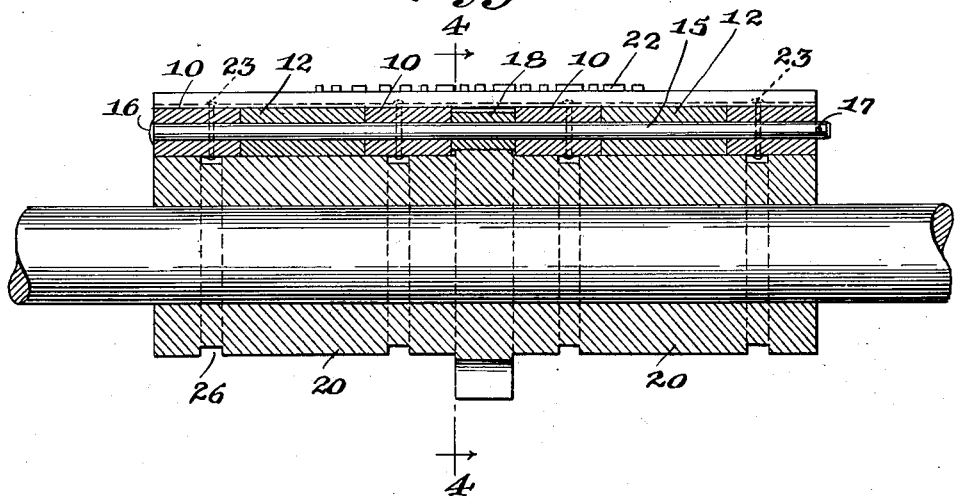
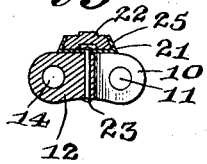
Inventor
Wesley P. Shomaker,
By Mawhinney & Mawhinney,
Attorneys

UNITED STATES PATENT OFFICE 1,974,369

PRINTING BELT

Wesley P. Shomaker, Richmond, Va.

Application January 25, 1932, Serial No. 588,694

7 Claims. (Cl. 101—111)

The present invention relates to printing mechanism, and has more particular reference to an improved construction of belt or chain adapted for use in dating devices used with printing machines.

An object of the present invention is to provide an improved construction of belt or chain comprising a plurality of hingedly connected links adapted to be brought one at a time into line with the print surface and which embodies structural features adapting the link to spaced roller supports and an intermediate sprocket feed of a positive nature preventing the belt or chain from slipping.

A further object of the invention is to provide a structure of chain or belt which not only provides sprocket engaging bars, but also roller bearings on said bars for direct contact with the teeth of a sprocket for reducing frictional contact between the sprocket and the belt and to insure an even and steady feed of the belt whereby the independent links thereof may be brought consecutively into proper register with the printing surface.

A further object of the invention is to provide a construction of belt or chain of this type wherein the links may be hingedly or pivotally connected together by a single bar or rod at each joint and wherein the intermediate portions of the bars or rods are utilized for the support and as the bearings for a series of rollers properly spaced apart one on each link for cooperation with the sprocket feed.

The invention also aims to provide a belt or chain of simplified construction and each link of which is composed of a pair of like or similar companion sections so that the entire belt or link may be made up of desired length for application to different types and sizes of dating machines and wherein the construction is economical as the sections of all of the links are of simple form and susceptible of easy and accurate manufacture.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a top plan view of a link constructed according to the present invention and provided with a single bearing bar or rod to which a like link may be attached.

Figure 2 is a similar view showing a plurality of links interfitted and pivotally connected together.

Figure 3 is a prospective view of a link showing its relation to a printing bar and its holder.

Figure 4 is a transverse section taken through a feeding and supporting mechanism for the belt or chain of this invention, showing a portion of the chain in position thereon, the section being taken on the line 4—4 of Figure 5.

Figure 5 is a section taken at right angles to the showing in Figure 4 substantially on the line 5—5 of Figure 4, and Figure 6 is a detail sectional view taken through one of the links, showing a printing bar and its holder mounted thereon.

Referring now to the drawings, and first to Figures 1 and 3, each link comprises a pair of transversely spaced apart like sections, and each section is provided with a pair of spaced ears 10 which are provided with transverse axially registering openings 11 therethrough at their outer edges. The ears 10 are joined by an intermediate offset ear 12 which projects outwardly in a direction opposite to the ears 10 and which is connected at its opposite sides and at its inner end to the ears 10 by neck portions 13 of substantial thickness so that the link section is of the required strength.

The link section, in effect, comprises a longitudinal bar 13 with ears at opposite ends which extend laterally from one side of the bar and with an intermediate ear 12 which extends laterally from the opposite side of the bar. The ear 12 is provided with a transverse opening 14 therethrough the axis of which is disposed in parallel relation with the axes of the openings 11 in the spaced ears 10.

Each link is composed of a desired number of these sections, such as two, as shown in the drawings and the sections are connected together by a bar or rod 15 which passes through the openings 11 of the ears 10 of each section so as to hold the ears 10 of the sections in transverse axial alignment with respect to the belt or chain. The bar or rod 15 has a head 16 at one end which bears against the outer side of an outer ear 10 and is provided with a retaining pin 17 on its opposite end adapted to engage against the opposite outermost ear 10 as shown in Figure 1.

The intermediate portion of the bar or rod 15, which extends across the space between the inner ends of the link sections comprises a support and bearing for a roller 18 providing a rack tooth at the inner side of the chain or belt for engagement with the teeth of a sprocket wheel 19, or the like, used for advancing or feeding the belt or chain.

It will be noted that the ears 10 of each section are spaced apart a distance equal substantially to the width of the intermediate ear 12 for the reception of the ear 12 of an adjacent link, and the ears 12 of a link are adapted to engage in the spaces between the ears 10 of an adjacent link and are held pivotally in said spaces by the bar or rod 15 of the link. This assemblage of the links is shown to advantage in Figure 2.

The ears 10 are of uniform width in all of the sections and are offset from the opposite ends of the intermediate ears 12 throughout their entire lengths so as to provide, at opposite sides of the intermediate ears 12 adequate spaces for the reception of the ears 10 of an adjacent link. Thus, the inner ends of the sections terminate in spaced planes and the spaces between such planes are bridged by the rollers 18, as shown in Figure 2. The sections of the links are thus disposed in spaced continuous lines and provide relatively flat bearing surfaces for the links of the chain for engagement over supporting rollers 20, as shown in Figures 4 and 5. The rollers 20 are disposed at opposite sides of the sprocket wheel 19 and may be connected thereto in any suitable manner such as shown. Of course, the rollers 20 and the sprocket wheels 19 may be used in desired numbers and the chain structure is built up accordingly by using the desired number of link sections and rollers 18.

The links of the chain are provided with holders 21 for printing bars 22. Each holder 21 is in the form of a flat strip or plate which is secured by rivets 23, or the like, to a link, and the holder 21 preferably extends throughout the width of the link and the rivets 23 pass through openings 24 which may be formed at the inner ends of the ears 10, as shown in Figures 1 and 3. The opposite longitudinal edges of the strip 21 are upturned and bent in convergent relation to provide dove-tail flanges 25 adapted to embrace the opposite lateral edges of the printing bar 22, which lateral edges are correspondingly beveled to cooperate with the flanges 25 in holding the bar 22 firmly upon the link. The bar 22 may be slid lengthwise into and out of the holder 21 through the opposite open ends of the holder so that the desired data, dates, and the like, may be quickly interchanged upon the belt or chain. Of course, the holder 21 may be used in desired numbers upon the chain or belt by merely securing the holders 21 upon the adjacent links, or at desired spaced intervals throughout the length of the chain or belt.

From Figure 5, it will be noted that the supporting rollers 20 are provided with annular depressions or grooves 26 in register with the inner ends of the rivets 23 so that the belt may lie flat over the rollers 20 and the rivets will not be subjected to frictional contact and wear which would otherwise occur and the belt or chain is not raised from the rollers at such point where the rivets 23 would contact therewith.

In operation, the belt or chain is built up of the links which are composed of the spaced similarly constructed sections with the rollers 18 between the sections of each link. The pivot bars or rods 15 are passed transversely through the interfitting portions of the links and thus hingedly engage through the aligned apertures 11 and 14 and through the rollers 18. The resulting structure provides transversely spaced apart bearing surfaces which are relatively smooth so as to engage over the supporting rollers 20 and with the continuous row of abutments or rollers 18 disposed between the spaced smooth sections and in line with the feeding sprocket 19. The teeth of the sprocket 19 engage the rollers 18 and reduce frictional contact between the belt and the feeding sprocket and insure the relatively easy and accurate operation of the belt or chain. As is indicated in Figure 5, the chain or belt is fed so as to bring the one or more printing bars 22 to the exposed portion of the device, or in the plane of the printing surface so that an impression of the type on the printing bar 22 may be made simultaneously with any other printing characters disposed in the printing plane. In actual operation of these dating, numbering and like machines, the belt or chain is fed intermittently and in certain stepped relation with respect to the location of the one or more type bars 22 which are employed so that the type bars 22 may bear different characters thereon, such as different dates, or the like, and they may be brought to the printing surface at stated intervals dependent upon the particular operation or advancement of the belt or chain.

It is obvious that various changes and modifications may be made in the details of construction and design of the above specifically described embodiment of this invention without departing from the spirit thereof, such changes and modifications being restricted only by the scope of the following claims:

What is claimed is:

1. A date printing belt for printing machines having a feeding sprocket and supporting rollers at opposite sides of the sprocket, comprising a series of pivotally connected links, each link comprising a pair of transversely spaced apart sections with a pivot rod engaging therethrough, each section having oppositely extending apertured projections proportioned to interfit with the projections of corresponding sections when adjacent links are brought together and the pivot rods of the respective links engaging the interfitting projections of the corresponding sections, and a roller mounted upon the pivot rod of each link between the sections thereof to hold the sections in spaced apart relation and provide a continuous row of spaced apart abutments adapted for interfitting engagement with the teeth of the feeding sprocket and with the sections of the links in line with and adapted to engage over the supporting rollers.

2. A date printing belt for printing machines having a feeding sprocket and supporting rollers at opposite sides of the sprocket, comprising a series of pivotally connected links, each link comprising a pair of transversely spaced apart sections with a pivot rod engaging therethrough, each section having oppositely extending apertured projections proportioned to interfit with the projections of corresponding sections when adjacent links are brought together and the pivot rods of the respective links engaging the interfitting projections of the corresponding sections, a roller mounted upon the pivot rod of each link between the spaced sections thereof to provide a continuous row of spaced apart abutments adapted for interfitting engagement with the teeth of the feeding sprocket and with the sections of the links in line with and adapted to engage over the supporting rollers, a holder mounted upon each link and extending across the sections thereof, and a removable printing bar mounted in the holder.

3. A printing belt for printing machines having sprocket feeding means and supporting rollers, comprising a series of links, each link comprising transversely spaced apart sections with oppositely extending apertured ears, said ears proportioned to interfit between the opposite ears of corresponding sections of adjacent links, transverse pivot rods engaging through the interfitting ears for pivotally connecting the same and engaging through the respective sections of each link for hingedly connecting the links together through their sections, rollers mounted on said transverse rods between the spaced sections of the links for interfitting engagement with the teeth of the feeding sprocket and with the sections disposed to pass over the supporting rollers, a holder secured across the spaced sections of a link, and a removable printing bar mounted in the holder.

4. A printing belt for printing machines having supporting rollers and sprocket feeding means, comprising a series of links, each link comprising spaced sections having oppositely offset apertured ears arranged for interfitting engagement with the opposed ears of the sections of adjacent links, transverse pivot bars engaging through the interfitting ears of the spaced sections of the links for hingedly connecting the links together, rollers mounted upon said transverse bars for intermeshing engagement with said sprocket feeding means, a holder secured across the outer faces of the sections of a link, and a printing bar detachably mounted in the holder.

5. A printing belt, having a link composed of a pair of spaced apart like sections, each section having a pair of apertured ears extending in one direction and an intermediate apertured ear extending in an opposite direction, a roller arranged between the sections of the link between the inner adjacent ears thereof, a transverse pivot rod extending through said pairs of ears of the sections of the link and through the intermediate roller for connecting the same together, a plate secured across the outer faces of said sections of the link and having its longitudinal edges upturned in convergent relation to provide a dove-tail groove, and a correspondingly shaped printing bar fitting in said groove and adapted to be removed therefrom by longitudinal sliding movement of the bar relatively to said plate.

6. A date printing belt for printing machines having a feeding sprocket and supporting rollers, comprising a series of links, each link having a pair of laterally spaced sections, each section comprising a pair of spaced ears extending in one direction and an intermediate ear connected between and offset and extending in an opposite direction from said spaced ears, said spaced ears being apertured in co-axial alignment and said intermediate ear being apertured in parallel axial relation to the apertures in the spaced ears and adapted to fit between the spaced ears of the corresponding section of an adjacent link with all of the corresponding apertures in the spaced sections in axial alignment, a pivot rod engaging through the aligned apertures of the interfitting ears of the spaced sections for hingedly connecting adjacent links of the belt and providing transversely spaced apart continuous smooth bearing surfaces to engage the supporting rollers, a roller mounted on each pivot rod between the spaced link sections to provide a continuous row of spaced abutments for engagement with the teeth of the feeding sprocket, a holder secured across the link and extending over both sections thereof, and a printing bar detachably mounted on the holder.

7. A unit section for a printing belt comprising a link body having a pair of spaced ears at one side and a single intermediate ear at its opposite side, said spaced ears having co-axial openings therethrough for the reception of a pivot rod, said single ear having an aperture therethrough with its axis in parallel relation to the axis of the pair of ears for receiving a second pivot rod therethrough, a holder mounted on the outer face of said link body, and a removable printing bar mounted in said holder.

WESLEY P. SHOMAKER.